Oct. 29, 1968 A. A. CROOKSTON 3,408,082

RECORD CLEANER

Filed Feb. 2, 1966

INVENTOR.
ALBERT A. CROOKSTON
BY
Oldham & Oldham
ATTYS.

United States Patent Office 3,408,082
Patented Oct. 29, 1968

3,408,082
RECORD CLEANER

Albert A. Crookston, 2257 Springfield-Center Road, Akron, Ohio 44312

Filed Feb. 2, 1966, Ser. No. 524,596
5 Claims. (Cl. 274—47)

ABSTRACT OF THE DISCLOSURE

A record cleaner for attachment to a turntable frame is provided and it includes a post for mounting on the frame adjacent the turntable, and a body having a deep pile fabric material on a flat lower surface thereof is secured to the post by a string whereby the body can be placed on a record for tracking in the grooves thereof for record cleaning action.

This invention relates to an improved record cleaner adapted to clean the grooves of the record as it is being played, and particularly, to a small body having a deep pile fabric material secured to its base wherein the body is placed on a record and tracks the record as it is being played with the pile of the fabric cleaning the grooves.

It always has been desirable in good sound reproduction of disc recordings to have the plastic record clean and as free from dust and dirt as possible. As is well known, the record consists of a number of grooves which have been cut therein with a diamond stylus. The stylus has been made to vibrate slightly in consonance with the sound being recorded and thus the grooves cut in the record are not smooth but contain many irregularities. The sound recorded on the record is reproduced by placing a stylus in the groove and then moving the record at a constant speed. It always has been a problem with disc recordings to keep these grooves free from dust and the like since dust readily collects in the grooves of the record and interferes with the vibrations imparted to the stylus to destroy fine sound reproduction.

Heretofore there have been many and various devices provided to clean records, some of which clean the record while it is being played. Insofar as I am aware, these devices usually take the form of some type of brush implement which is attached to the arm of the record player and is adapted to clean the grooves of the record prior to the stylus passing therethrough. These devices have been inefficient, impractical, and cumbersome.

It is the object of the present invention to overcome these stated, and other difficulties in the prior art, by providing an inexpensive, efficient, device adapted to be placed on the record independent of the record arm and stylus wherein the device will follow the grooves inwardly to the end of the record as it is being played, thereby cleaning the grooves.

Figure 1:
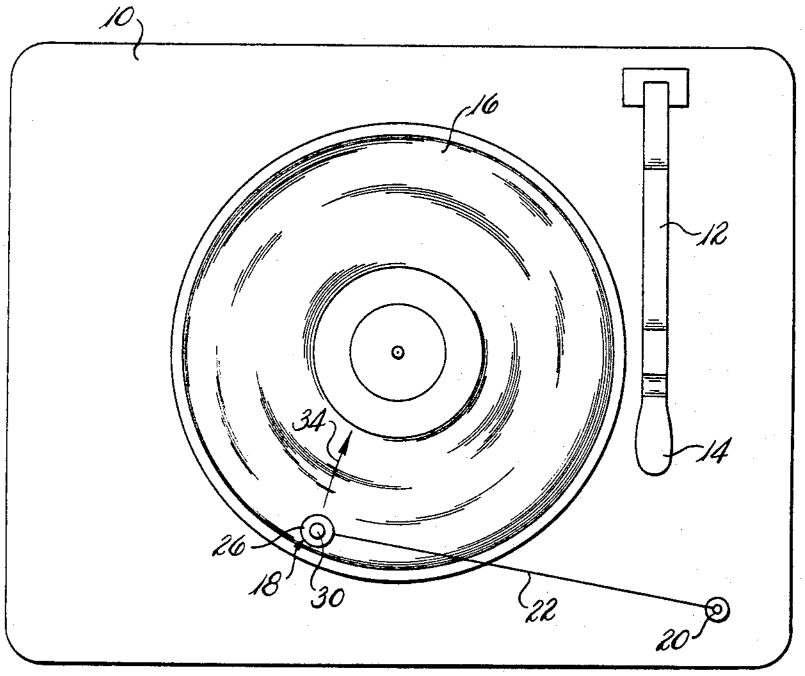
Figure 2:
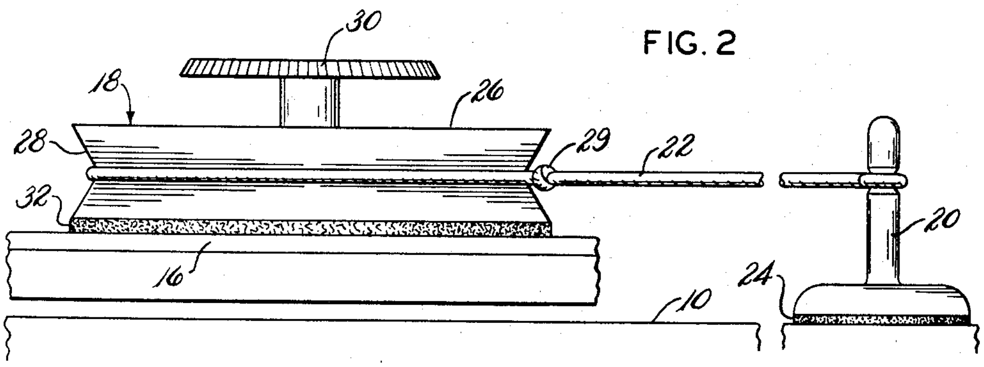

In the drawings, FIG. 1 is a plan view of a record turntable particularly illustrating a preferred embodiment of the apparatus of the invention; and FIG. 2 is an enlarged, side elevation of the record cleaning body, particularly illustrating the way in which the body sits on and cleans a record.

FIG. 1 illustrates a standard turntable frame 10 to which the apparatus of the invention has been particularly adapted. The turntable frame 10 has a standard record arm 12 positioning a head, or stylus 14. Also shown is a record 16 which has been placed on the turntable operatively positioned on the frame. The record cleaning device of the invention consists basically of two portions, the first being the actual record cleaning body 18 which has been attached to a post 20 by means of a string 22.

The post 20, best illustrated by FIG. 2 is adapted to be secured to the turntable frame by suitable means, such as a suction cup or a layer of adhesive 24 on the base of the post 20. Thus, in actual operation, a release paper (not shown) usually provided and covering the adhesive 24 when it is pressure sensitive will be peeled off the base of the post 20 thereby exposing the pressure sensitive adhesive 24 so that the post 20 can be pushed down on and secured to the turntable frame 10 in a position best adapted to facilitate the record cleaning action of the apparatus of the invention.

The actual record cleaning body 18, best illustrated by FIG. 2, is light in weight and may be made of any suitable material and consists of a main body portion 26 which is substantially pulley-shaped, and has a circumferentially extending groove 28 cut therein. The purpose of the groove 28 cut or otherwise formed in the main portion 26 of the body 18, is to receive the string 22 which attaches the body 18 to the post 20. The string 22 is not tightly secured to the body 18, but instead is rather loosely tied at knot 29 to permit some play or rotation of the body 18 within the confines of the string 22. A knob 30 also forms a portion of and/or is secured to the body 18, the purpose of such a knob 30 being to permit the body 18 to be easily picked up and moved. Secured to the base of the body 18 is a very fine nylon pile velvet material 32, or equivalent, and the nap of the material 32 is particularly adapted to fit or be received in the grooves of the record 16.

In the actual operation of the record cleaning device of the invention, the body 18 is extended out to substantially the full length permitted by string 22 from the post 20 and placed on the edge of the record 16 so that the string 22 is fairly taut. The particular quality of the material 32 secured to the base of the body 18, as previously explained, permits it to fit in the grooves of the record in such a manner that as the record is being played, the body 18 will track the record. Thus, when the body is placed on the edge of the record 16 as indicated by FIG. 1, the body will follow the grooves of the record 16 inwardly in the direction of arrow 34 while the record is being played. As the body 18 follows the grooves inwardly to the center of the record, the fabric 32 fits in the grooves and cleans them in such a manner that, as the record plays, each groove is cleaned several times in a single playing.

Since the biggest factor in poor sound reproduction does not seem to be wear, but rather very fine particles of dirt and dust which become embedded in the grooves of the record, it has been found that the use of the record cleaning device of the apparatus of the invention substantially improves the sound reproduction produced by the record playing outfit, and also substantially improves the life of the record 16 itself. Tests have proven that several records which have been thought to be old, and no longer usable, have had their sound reproduction qualities noticeably improved after a few plays with the use of the record cleaning device of the invention.

It also has been determined that since the material 32 tends to pick up dust and dirt as it travels over the grooves of the record, occasionally the body 18 should be slightly turned or rotated within the string 22. Since the string 22 is only loosely secured to the body 18 as hereinbefore explained, such a rotation of the body 18, so that the fabric 32 will be traveling over the grooves of the record in a different direction, is easily accomplished. The fabric 32 can be cleaned by a brush or by knocking it against an object to release dirt and dust particles therefrom.

While a certain representative embodiment and details have been shown for the purpose of illustrating the invention, it will be apparent to those skilled in this art that various changes and modifications may be made therein without departing from the spirit or scope of the invention.

What is claimed is:

1. A record cleaner adapted to be mounted in association with a turntable frame having a turntable, and record arm carrying a stylus thereon operatively associated with the turntable frame to clean a record as it is being played, including:

a post means adapted to be removably mounted on said frame in close proximity to the turntable, a flat body means having a flat surface and being self supported on said flat surface, flexible string means connecting said body means to said post means wherein the movement of said body means away from said post means is limited, and a deep pile fabric material secured to a flat surface of the body means wherein the covered flat surface of the body means is placed on a record on the turntable, the pile of the fabric material substantially fits in the grooves of the record so that the body means tracks the record as it is being played with the pile cleaning the grooves of the record.

2. A record cleaner according to claim 1 wherein said means connecting said body means to said post means is a string.

3. A record cleaner according to claim 1 wherein said body means is of lightweight, is of substantially disc-shape, is adapted to be horizontally positioned and includes a knob on its upper surface.

4. A record cleaner according to claim 3 wherein the deep pile fabric material secured to the body means is a very fine nylon pile velvet, the body means having a flat lower surface to which such material is secured.

5. A record cleaner according to claim 1 wherein said post means has a base to which a pressure sensitive adhesive is secured whereby said post means can be adjusted in position on a said turntable frame.

References Cited

UNITED STATES PATENTS

| | | | |
|---|---|---|---|
| 1,225,847 | 5/1917 | Palmer | 274—47 |
| 1,404,147 | 1/1922 | Runk | 274—47 |
| 1,529,507 | 3/1925 | Runk | 274—47 |

LEONARD FORMAN, *Primary Examiner.*

FELIX J. D'AMBROSIO, *Assistant Examiner.*